United States Patent [19]

Goeppel

[11] Patent Number: 5,671,384

[45] Date of Patent: Sep. 23, 1997

[54] WORK STATION WITH A DMA CONTROLLER HAVING EXTENDED ADDRESSING CAPABILITY

[75] Inventor: Anton Goeppel, Burgau, Germany

[73] Assignee: NCR Corporation, Dayton, Ohio

[21] Appl. No.: 752,815

[22] Filed: Aug. 30, 1991

[30] Foreign Application Priority Data

Aug. 31, 1990 [GB] United Kingdom ............ 9019026

[51] Int. Cl.$^6$ ...................................... G06F 13/28
[52] U.S. Cl. ............................ 395/402; 395/842
[58] Field of Search ...................... 395/325, 425, 395/800 MS, 402, 842; 364/200 MS File, 900 MS File

[56] References Cited

U.S. PATENT DOCUMENTS

| | | | |
|---|---|---|---|
| 4,646,232 | 2/1987 | Chang et al. | 395/293 |
| 4,744,078 | 5/1988 | Kowalcyzk | 370/364 |
| 4,835,733 | 5/1989 | Powell | 395/421.08 |
| 4,949,301 | 8/1990 | Joshi et al. | 395/427 |
| 5,003,471 | 3/1991 | Gibson | 395/250 |

FOREIGN PATENT DOCUMENTS 0382358  8/1990  European Pat. Off. .

OTHER PUBLICATIONS

Microprocessors, Intel Corp., 1990, pp. 4–654 to 4–661.

*Primary Examiner*—Tod R. Swann
*Assistant Examiner*—B. Peikari
*Attorney, Agent, or Firm*—Douglas S. Foote; James H. Beusse

[57] ABSTRACT

A DMA controller is connected to a CPU in a work station. The controller includes a multiple byte memory address register (MAR), and a pointer register connected between the CPU and MAR. The pointer register is responsive to a command from the CPU to give the CPU successive access to the byte positions of the MAR for writing a memory address thereto. The DMA controller may also include a single byte register associated with the pointer register and connected between the CPU and MAR. The CPU writes an address to the MAR one byte at a time via the single byte register. Preferably, the MAR has a capacity of four 8 bit bytes.

8 Claims, 3 Drawing Sheets

WORK STATION WITH A DMA CONTROLLER HAVING EXTENDED ADDRESSING CAPABILITY

The present invention relates to a work station or similar data processing system of the kind including a central processing unit (CPU) communicating with various other units such as memories, peripherals etc. More particularly, it relates to a work station having a direct memory access (DMA) controller with extended addressing capability.

CROSS-REFERENCE TO RELATED APPLICATIONS

"Work Station Having Multiprocessing Capability", U.S. patent application Ser. No. 752,747, filed concurrently herewith, invented by Otto Duerrschmid and Edward C. King.

"Work Station or Similar Data Processing System Including Interfacing Means to Microchannel Means", U.S. patent application Ser. No. 752,710, filed concurrently herewith, invented by V. Thomas Powell, Anton Goeppel, Edward C. King and G. Roerhl.

"Work Station Including a Direct Memory Access Controller and Interfacing Means to Microchannel Means", U.S. patent application Ser. No. 753,273, filed concurrently herewith, invented by Georg Dollinger and Edward C. King.

"Work Station and Method for Configuring Thereof", U.S. patent application Ser. No. 752,814, filed concurrently herewith, invented by Anton Goeppel.

"Work Station Interfacing Means Having Burst Mode Capability", U.S. patent application Ser. No. 752,383, filed concurrently herewith, invented by Edward C. King and Anton Goeppel.

"Internal Bus for Work Station Interfacing Means", U.S. patent application Ser. No. 752,371, filed concurrently herewith, invented by Edward C. King and Anton Goeppel.

"Work Station Architecture With Selectable CPU", U.S. patent application Ser. No. 752,819, filed concurrently herewith, invented by Edward C. King and Anton Goeppel.

"Register Control for Workstation Interfacing Means", U.S. patent application Ser. No. 752,727, filed concurrently herewith, invented by Anton Goeppel.

"Work Station Having Multiplexing and Burst Mode Capabilities", U.S. patent application Ser. No. 752,407, filed concurrently herewith, invented by Anton Goeppel and Edward C. King.

BACKGROUND OF THE INVENTION

Known work stations use a specific CPU, e.g. an Intel 80386 microprocessor, provided on a system board together with other chip units such as memories, various peripheral interfaces and a system bus controller. The CPU and the above mentioned units communicate with each other, partially through buffers, over a local bus comprising control, address and data lines, all units being under tight control of the CPU through the local bus. In general, the system design is tailored for the specific CPU. This means that a large variety of different chip units are required for work stations using different CPUs. The local bus also is tailored for the specific configuration. In order to maintain compatibility with other systems, detailed specifications rigidly determine the features and functions of the various units and their I/O registers. Thus, it is difficult to modify the system for expansion and improved performance.

Specifically, known standard work stations using as a CPU a microprocessor such as Intel 80386 or 80486 are restricted in memory addressing. Such work stations use a direct memory access (DMA) controller which allows I/O devices to transfer data directly to and from memory. This frees the CPU from I/O tasks resulting in a higher throughput.

The DMA controller of a known standard work station includes a limited number of I/O registers for direct access by the CPU. In particular, a known standard work station includes a memory address register having a 3-byte capacity, with 8 bits per byte. This means that with a 24-bit address capability 16 megabytes (MB) may be addressed. This is a restriction which considerably limits the performance of modern work stations. In view of the need to maintain compatibility with known standard work stations, it has been deemed difficult to achieve changes in memory address capability.

OBJECTS OF THE INVENTION

It is an object of the present invention to provide a work station compatible with a standard system and having a high memory address capability.

It is another object of the present invention to provide an improved DMA controller for a work station.

SUMMARY OF THE INVENTION

The present invention is a DMA controller connected to a CPU in a work station. The controller includes a multiple byte memory address register (MAR), and a pointer register connected between the CPU and MAR. The pointer register is responsive to a command from the CPU to give the CPU successive access to the byte positions of the MAR for writing a memory address thereto.

In a further embodiment of the invention the DMA controller also includes a single byte register associated with the pointer register and connected between the CPU and MAR. The CPU writes an address to the MAR one byte at a time via the single byte register. Preferably, the MAR has a capacity of four 8 bit bytes.

One embodiment of the invention will now be described by way of example with reference to the accompanying drawings.

BRIEF DESCRIPTION OF THE INVENTION

DESCRIPTION OF A PREFERRED EMBODIMENT

Figure 1:
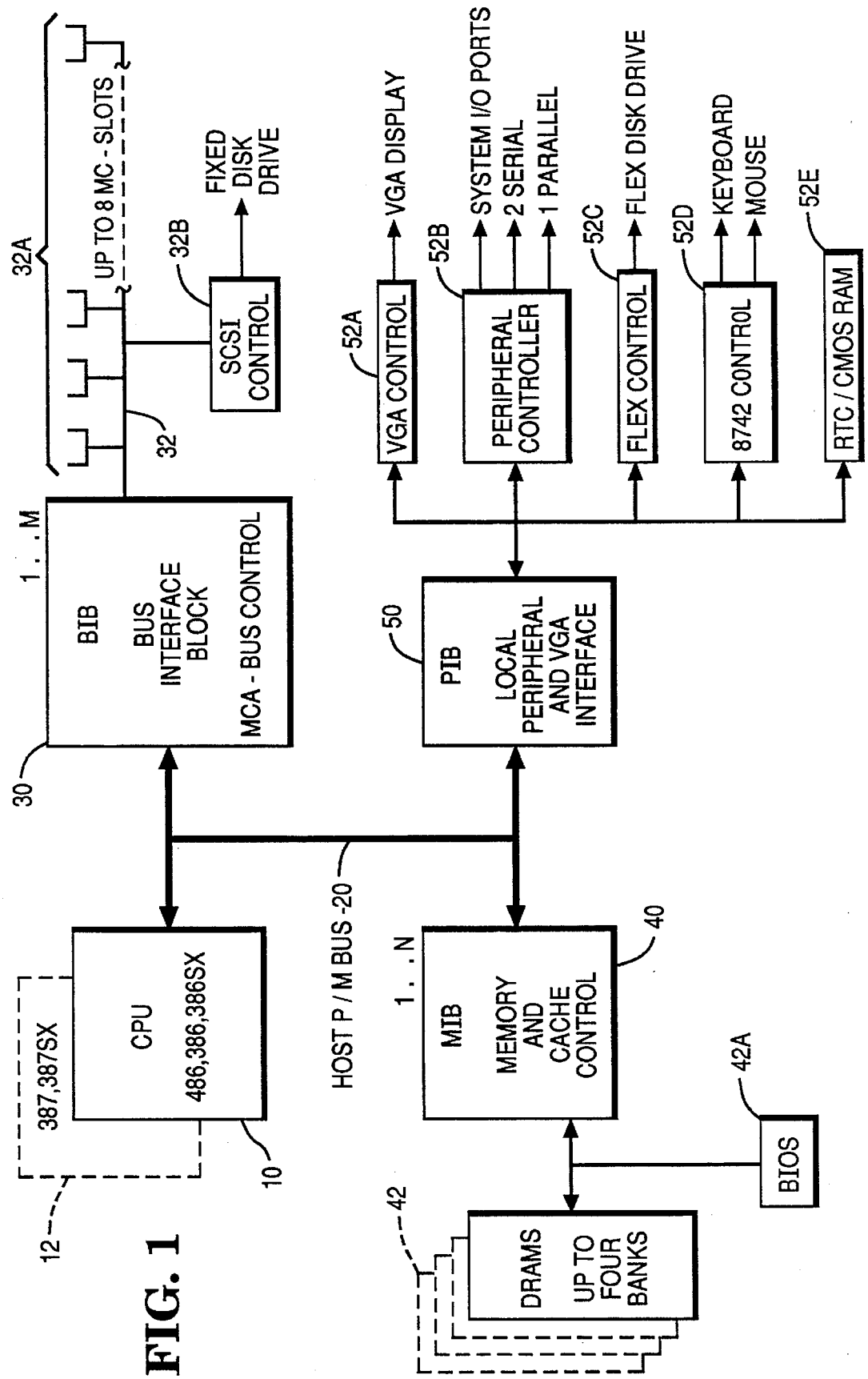
FIG. 1 is a schematic overall view of an embodiment of a work station according to the invention illustrating the various functional blocks and the connections therebetween.

FIG. 1 shows a preferred embodiment of a work station or data processing system according to the invention.

Basically, a CPU communicates through a host P/M bus 20 with functional blocks 30, 40, and 50, and in particular with one or a plurality of bus interface blocks (BIB) 30 for microchannel access, with one or a plurality of memory interface blocks (MIB) 40 for memory and cache control, and with a local peripheral and Video Graphics Array (VGA) interface block PIB 50.

It should be noted that different types of microprocessors may be used for the CPU 10, such as the Intel 80386, 80386SX, and 80486 microprocessors. Also, a coprocessor 12, such as a mathematical coprocessor Intel 80387, or 80387SX, may be added.

The functional block BIB 30 is provided as an interface between the host P/M bus 20 and a microchannel 32 provided with a plurality of slots 32a for attaching conventional input/output adapter boards, including adapter boards provided with a microprocessor which may act as a master in communication with other functional blocks of the work station. Also, an example of an adapter board is a circuit board carrying additional memory. Furthermore, a control 32b is connected to the microchannel 32 for controlling a fixed disk drive.

The functional block MIB 40 forms an interface between the host P/M bus 20 and a DRAM memory 42 which may have different sizes with a presently usual size of 16 MB up to 64 MB. Furthermore, MIB 40 controls access to the usual BIOS ROM memory 42a.

Functional peripheral interface block (PIB) 50 forms an interface between the host P/M bus 20 and various conventional system and peripheral units through respective control blocks. Thus, there is provided a VGA control 52a, a peripheral controller 52b, a flexible disk control 52c, a keyboard/mouse control 52d, and a RTC/CMOS RAM unit 52e. All these units are well known in the art, and therefore they will not be described in further detail.

Figure 2:
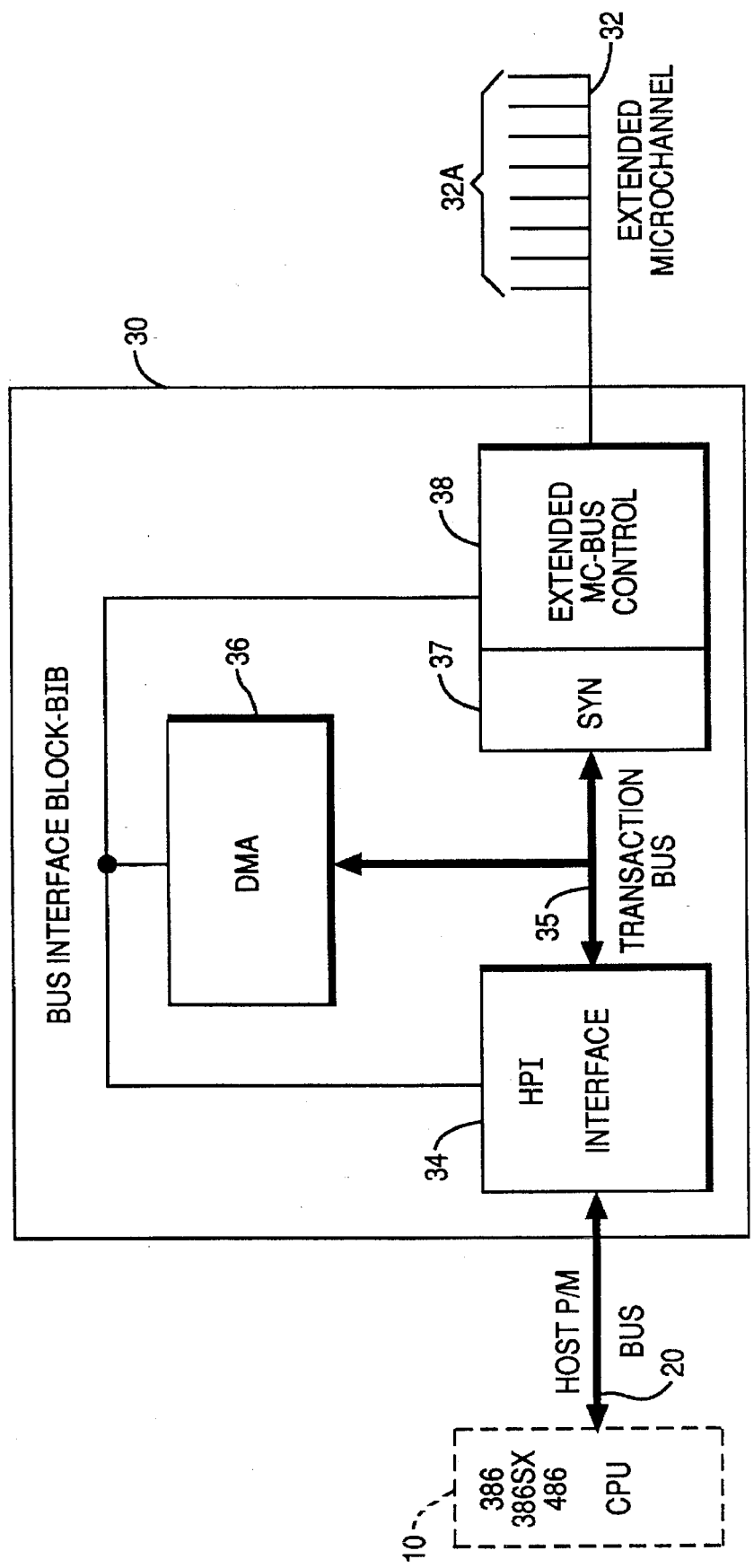
FIG. 2 is a block diagram of a bus interface block BIB including a DMA controller designed according to the invention.

FIG. 2 illustrates in some detail the units contained in the functional block 30. Specifically referring to FIG. 2, the bus interface block BIB 30 comprises, arranged on one chip, a host P/M bus interface circuit HPI 34 forming an interface between the host P/M bus 20 and an internal transaction bus 35 thereby enabling communication between DMA controller 36 and CPU 10. Internal transaction bus 35 provides communication connections to a synchronizing unit 37 which is connected to an extended MC-bus control unit 38 for access to the microchannel 32. Further connected to the internal transaction bus 35 is a direct memory access (DMA) controller 36 for controlling direct memory access. It should be understood that the DMA controller 36 provides DMA capability between any device which takes control of the microchannel 32 and any memory that is available in the system.

The DMA controller 36 is software programmable and may operate in a program mode or a DMA transfer mode. In the program mode, the CPU 10 may address the DMA controller 36 and can read or modify internal registers thereof to define various DMA modes, transfer addresses, etc. During the DMA transfer mode, the DMA controller 36 performs data transfer.

Figure 3:
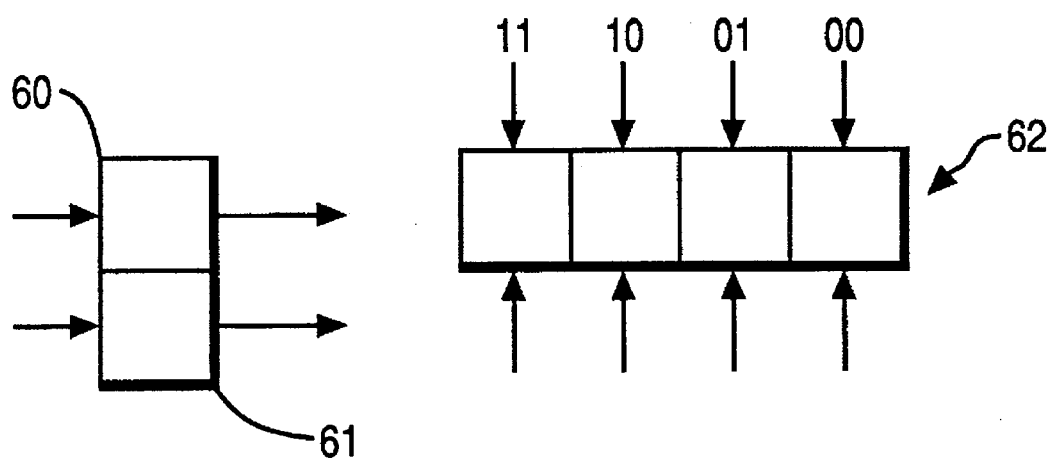
FIG. 3 is a schematic representation of registers included in the DMA controller.

Referring now additionally to FIG. 3, the internal registers of the DMA controller 36 include a memory address register (MAR) 62, and an associated pointer register 60 and 8-bit register 61. For initiating a data transfer, a command to be executed is "write memory start address" which command uses the pointer register 60 and register 61 to write a memory start address byte by byte into the memory address register 62 which, according to a preferred embodiment, has a 4-byte (8 bits per byte) i.e. 32-bit, capacity. For executing the command "write memory start address", the CPU 10 first sets the pointer register 60 to point to the least significant byte 00 of the memory address register 62, following which the least significant byte of the start address is written by the CPU 10 via the register 61 into this least significant byte position of the memory address register 62. Next, the pointer register 60 advances to point to the next more significant byte 01 of the memory address register 62 for writing of the next byte of the start address into the memory address register 62 via the register 61. Loading of the memory address register 62 proceeds in this manner until the pointer register 60 gives access to the most significant byte position 11 of the memory address register 62, whereby the full 4-byte start address is written into the memory address register 62. It has been found that by including the most significant byte position in the memory address register 62, together with the use of the pointer register 60, the memory addressing capability of a work station in accordance with the invention is extended considerably, from 16 MB to 4 gigabytes (GB), while maintaining compatibility of the work station with a standard system.

Thus, a work station in accordance with the invention has considerably increased memory addressing capability compared with known work stations of standardized configuration.

The detail design of the present invention is captured in CDL, a high level hardware description language. CDL is a software tool which unambiguously defines the hardware for a digital logic system. The following CDL-file gives an example of the implementation of a part of the embodiment of the work station according to the invention. The listing may be compiled to generate a "C" source code which may then be compiled by a C compiler to generate a standardized C object file format. A logic synthesis program is available from the attached CDL listing.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A work station including a CPU connected to a DMA controller, said controller comprising:

a multiple byte memory address register (MAR) for storing a multiple byte memory address; and a pointer register connected between the CPU and MAR;

wherein said pointer register is responsive to a command from said CPU to give said CPU successive access to the byte positions of said MAR for writing a memory address thereto.

2. A work station according to claim 1, wherein said controller further comprises:

a single byte register associated with said pointer register and connected between said CPU and MAR;

wherein said CPU writes an address to said MAR one byte at a time via said single byte register.

3. A work station according to claim 2 wherein said MAR has a capacity of four 8 bit bytes.

4. A work station according to claim 1, including an interface circuit enabling communication between said DMA controller and said CPU.

5. A work station according to claim 4, wherein said DMA controller and said interface circuit are incorporated in one integrated microchip.

6. A work station according to claim 5, wherein said DMA controller and said interface circuit are connected to a synchronizer via an internal bus, whereby said DMA controller, said interface circuit, said synchronizer and said bus act as a self-contained functional block operating with a timing independent of that of said CPU.

7. A work station including a CPU connected to a microchannel bus through a single integrated microchip interface block, wherein said block operates with a timing independent of that of said CPU, and wherein said block comprises:

a DMA controller;

an interface circuit enabling communication between said DMA controller and said CPU;

a synchronizer; and an internal bus connecting said DMA controller, interface circuit and synchronizer;

wherein said DMA controller includes:

a multiple byte memory address register (MAR) for storing a multiple byte memory address;

a pointer register connected between said CPU and MAR; and a single byte register associated with said pointer register and connected between said CPU and MAR;

wherein said pointer register is responsive to a command from said CPU to give said CPU successive access to the byte positions of said MAR for writing a memory address thereto; and wherein said CPU writes an address to said MAR one byte at a time via said single byte register.

8. A work station according to claim 7 wherein said MAR has a capacity of four 8 bit bytes.

* * * * *